United States Patent [19]

Toyono et al.

[11] Patent Number: 4,932,759

[45] Date of Patent: Jun. 12, 1990

[54] DRIVING METHOD FOR OPTICAL MODULATION DEVICE

[75] Inventors: Tsutomu Toyono, Yokohama; Akihiro Mouri, Kokubunji; Shuzo Kaneko, Tokyo; Yutaka Inaba, Kawaguchi; Junichiro Kanbe, Yokohama, all of Japan

[73] Assignee: Canon Kabushiki Kaisha, Tokyo, Japan

[21] Appl. No.: 945,578

[22] Filed: Dec. 23, 1986

[30] Foreign Application Priority Data

Dec. 25, 1985 [JP] Japan .............................. 60-295307

[51] Int. Cl.[5] .............................................. G02F 1/13

[52] U.S. Cl. .............................. 350/350 S; 350/333; 340/784

[58] Field of Search .................... 350/332, 333, 350 S; 340/784, 805, 811, 802

[56] References Cited

U.S. PATENT DOCUMENTS

| | | | |
|---|---|---|---|
| 4,591,886 | 5/1986 | Umeda et al. | 350/356 |
| 4,638,310 | 1/1987 | Ayliffe | 350/333 |
| 4,701,026 | 10/1987 | Yazaki et al. | 350/350 S |
| 4,705,345 | 11/1987 | Ayliffe et al. | 350/350 |
| 4,712,872 | 12/1987 | Kanbe et al. | 350/333 |
| 4,715,688 | 12/1987 | Harada et al. | 350/350 S |
| 4,725,129 | 2/1988 | Kondo et al. | 350/350 S |
| 4,746,196 | 5/1988 | Umeda et al. | 350/350 S |

FOREIGN PATENT DOCUMENTS

| | | | |
|---|---|---|---|
| 0156046 | 8/1985 | Japan | 350/350 S |
| 0172029 | 9/1985 | Japan | 350/350 S |
| 0201325 | 10/1985 | Japan | 350/350 S |
| 0203920 | 10/1985 | Japan | 350/350 S |
| 2141279 | 12/1984 | United Kingdom | 350/333 |

OTHER PUBLICATIONS

Lechner et al.—"Liquid Crystal Matrix Displays", Proceedings of the IEEE—vol. 59—No. 11, Nov. 1971—pp. 1566-1579.

T. Harada—"An Application of Chiral Smectic . . . Display", pp. 131-134—SID 85 DIGEST—1985.

J. M. Geary—"A Multiplexed Ferroelectric . . . States", pp. 128-130—SID 85 DIGEST—1985.

Clark et al., "Submicrosecond Bistable . . . Liquid Crystals", pp. 899-901—Appl. Phys. Letters—vol. 36, No. 11—1980.

*Primary Examiner*—Stanley D. Miller

*Assistant Examiner*—Tai Van Duong

*Attorney, Agent, or Firm*—Fitzpatrick, Cella, Harper & Scinto

[57] ABSTRACT

An optical modulation device includes scanning electrodes and signal electrodes disposed opposite to and intersecting with the signal electrodes, and an optical modulation material disposed between the electrodes, a pixel being formed at each intersection of the electrodes so as to provide a matrix of pixels as a whole and having a contrast depending on the polarity of a voltage applied thereto. The device is driven by a method including, in a writing period for writing in the respective pixels on a selected scanning electrode: at least two repeating sets of phases, each set of phases comprising a state-determining phase for determining the contrast of a pixel and an auxiliary phase for not determining the contrast of the pixel.

33 Claims, 7 Drawing Sheets

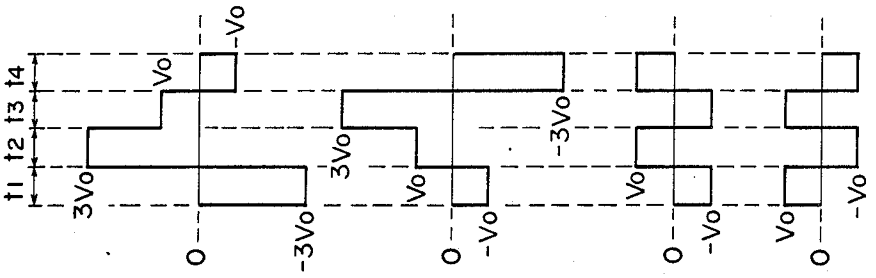
FIG. 6A
FIG. 6B
FIG. 6C
FIG. 6D
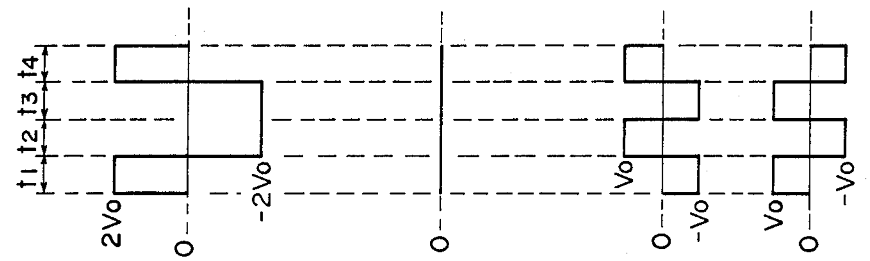
FIG. 5A
FIG. 5B
FIG. 5C
FIG. 5D

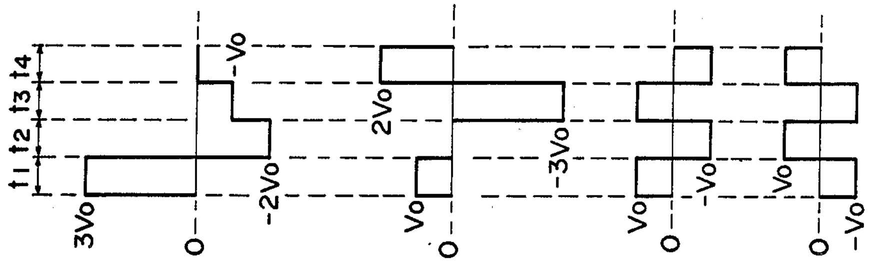
FIG. 9A
FIG. 9B
FIG. 9C
FIG. 9D
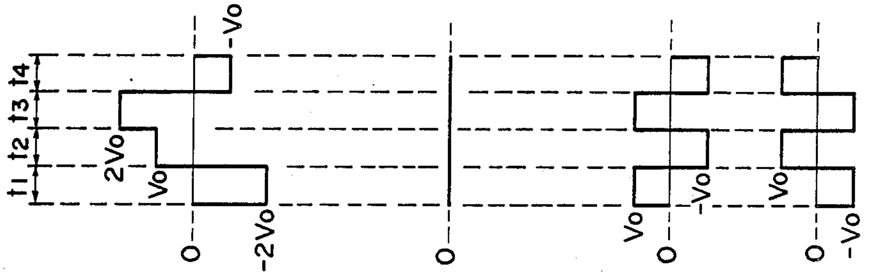
FIG. 8A
FIG. 8B
FIG. 8C
FIG. 8D

DRIVING METHOD FOR OPTICAL MODULATION DEVICE

FIELD OF THE INVENTION AND RELATED ART

The present invention relates to a driving method for an optical modulation device in which a contrast is discriminated depending on the direction of an applied electric field, particularly a driving method for a ferroelectric liquid crystal device showing at least two stable states.

Hitherto, there is well known a type of liquid crystal device wherein scanning electrodes and signal electrodes are arranged in a matrix, and a liquid crystal compound is filled between the electrodes to form a large number of pixels for displaying images or information. As a method for driving such a display device, a time-division or multiplex driving system wherein an address signal is sequentially and periodically applied to the scanning electrodes selectively while prescribed signals are selectively applied to the signal electrodes in a parallel manner in phase with the address signal, has been adopted.

Most liquid crystals which have been put into commercial use as such display devices are TN (twisted nematic) type liquid crystals, as described in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127–128.

In recent years, as an improvement on such conventional liquid crystal devices, the use of a liquid crystal device showing bistability has been proposed by Clark and Lagerwall in Japanese Laid-Open Patent Application No. 107216/1981, U.S. Pat. No. 4367924, etc. As bistable liquid crystals, ferroelectric liquid crystals showing chiral smectic C phase (SmC*) or H phase (SmH*) are generally used. These liquid crystal materials have bistability, i.e., a property of assuming either a first stable state or a second stable state and retaining the resultant state when the electric field is not applied. These liquid crystal materials also have a high response speed in response to a change in electric field, so that they are expected to be widely used in the field of a high speed and memory type display apparatus, etc.

However, this bistable liquid crystal device may still cause a problem, when the number of pixels is extremely large and a high speed driving is required, as clarified by Kanbe et al in GB-A 2141279. More specifically, if a threshold voltage required for providing a first stable state for a predetermined voltage application time is designated by $-V_{th1}$ and one for providing a second stable state is designated by $V_{th2}$ respectively for a ferroeclectric liquid crystal cell having bistability, a display state (e.g., "white") written in a pixel can be inverted to the other display state (e.g., "black") when a voltage is continuously applied to the pixel for a long period of time.

FIG. 1 shows a threshold characteristic of a bistable ferroelectric liquid crystal cell. More specifically, FIG. 1 shows the dependency of a threshold voltage ($V_{th}$) required for switching of display states on voltage application time when HOBACPC (showing the characteristic curve 11 in the figure) and DOBAMBC (showing curve 12) are respectively used as a ferroelectric liquid crystal.

As apparent from FIG. 1, the threshold voltage $V_{th}$ has a dependency on the application time, and the dependency is more marked or sharper as the application time becomes shorter. As will be understood from this fact, in case where the ferroelectric liquid crystal cell is applied to a device which comprises numerous scanning lines and is driven at a high speed, there is a possibility that even if a display state (e.g., bright state) has been given to a picture element at the time of scanning thereof, the display state is inverted to the other state (e.g., dark state) before the completion of the scanning of one whole picture area when an information signal below $V_{th}$ is continually applied to the pixel during the scanning of subsequent lines.

It has become possible to prevent the above mentioned reversal phenomenon by applying an auxiliary signal as disclosed by Kanbe et al in GB-A 2141279. However, in a case where a ferroelectric liquid crystal causing an inversion between stable states at a shorter voltage application time with respect to a prescribed weak voltage, such an inversion can still occur. This is because when a certain signal electrode is supplied with a "white" information signal and a "black" information signal alternately in the multiplex driving, a pixel after writing on the signal electrode is supplied with a voltage of one and the same polarity for a period of 4Δt or longer (Δt: a period for applying a writing voltage), whereby a written state of the pixel after writing (e.g., "white") can be inverted to the other written state (e.g., "black").

SUMMARY OF THE INVENTION

An object of the present invention is to provide a driving method for an optical modulation device having solved the problems encountered in conventional liquid crystal display devices or optical shutters.

According to the present invention, there is provided a driving method for an optical modulation device comprising scanning electrodes and signal electrodes disposed opposite to and intersecting with the signal electrodes, and an optical modulation material disposed between the scanning electrodes and the signal electrodes, a pixel being formed at each intersection of the scanning electrodes and the signal electrodes and showing a contrast depending on the polarity of a voltage applied thereto;

The driving method comprising, in a writing period for writing in the respective pixels on a selected scanning electrode among the scanning electrodes: at least two repeating sets of phases, each set of phases comprising a state-determining phase for determining the contrast of a pixel and an auxiliary phase for not determining the contrast of the pixel.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5A–5D respectively show voltage waveforms of signals applied to electrodes;

FIGS. 6A–6D respectively show voltage waveforms of signals applied to pixels;

FIGS. 8A–8D show voltage waveforms of another set of signals applied to electrodes;

FIGS. 9A–9D show voltage waveforms of another set of signals applied to pixels.

DESCRIPTION OF THE PREFERRED EMBODIMENTS

As an optical modulation material used in a driving method according to the present invention, a material having at least two stable states, particularly one having either a first optically stable state or a second optically stable state depending upon an electric field applied thereto, i.e., bistability with respect to the applied electric field, particularly a liquid crystal having the above-mentioned property, may suitably be used.

Preferable liquid crystals having bistability which can be used in the driving method according to the present invention are chiral smectic liquid crystals having ferroelectricity. Among them, chiral smectic C (SmC*)- or H (SmH*)-phase liquid crystals are suitable therefor. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals"; "Kotai Butsuri (Solid State Physics)"16(141), 1981 "Liquid Crystal", etc. Ferroelectric liquid crystals disclosed in these publications may be used in the present invention.

More particularly, examples of ferroelectric liquid crystal compound used in the method according to the present invention are decyloxybenzylidene-p'-amino-2-methylbutyl-cinnamate (DOBAMBC), hexyloxy-benzylidene-p'-amino-2-chloropropylcinnamate (HOBACPC), 4-o-(2-methyl)-butylresorcylidene-4'-octylaniline (MBRA8), etc.

When a device is constituted by using these materials, the device may be supported with a block of copper, etc., in which a heater is embedded in order to realize a temperature condition where the liquid crystal compounds assume an SmC*-or SmH*-phase.

Further, a ferroelectric liquid crystal formed in chiral smectic F phase, I phase, J phase, G phase or K phase may also be used in addition to those in SmC* or SmH* phase in the present invention.

Figure 1:
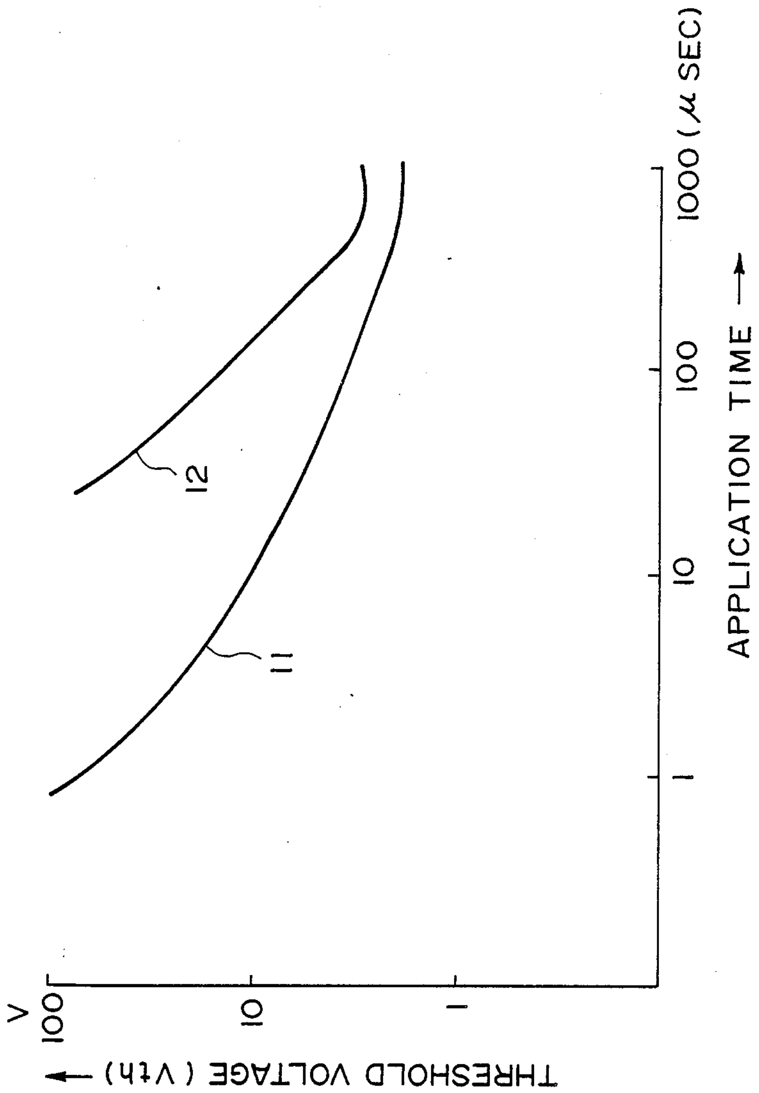
FIG. 1 shows threshold characteristic curves of ferroelectric liquid crystals.
Figure 2:
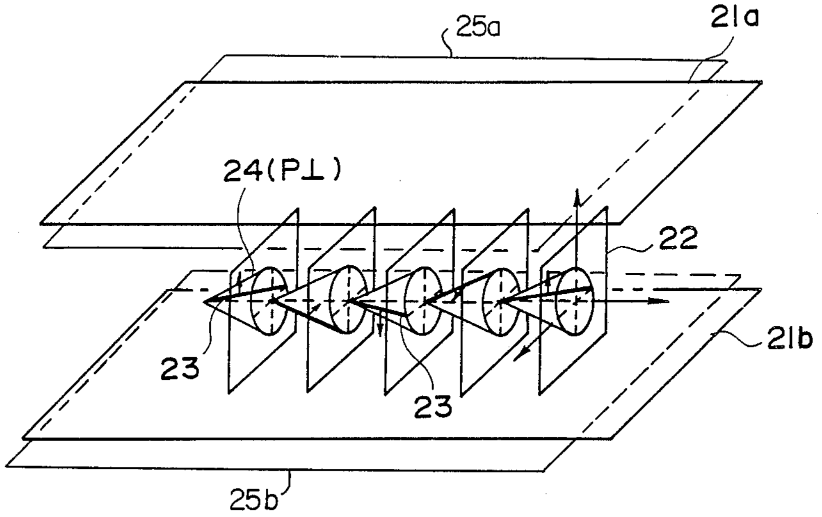
FIGS. 2 and 3 are schematic perspective views for illustrating the operation principles of a ferroelectric liquid crystal device used in the present invention.
Figure 3:
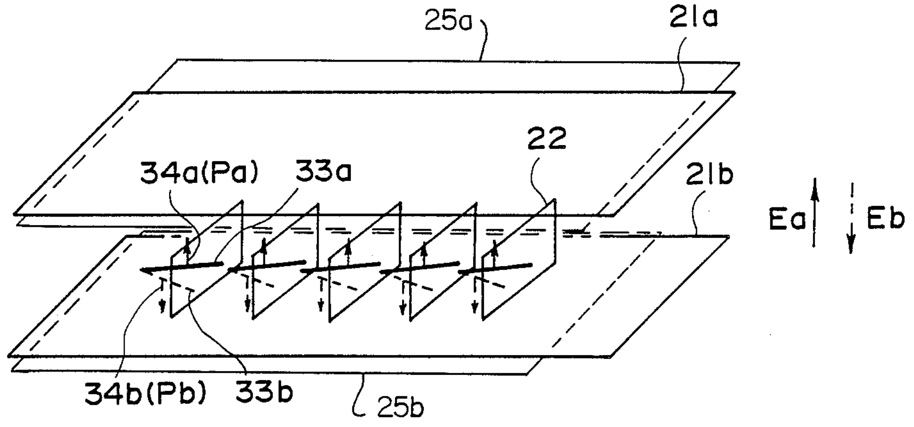

Referring to FIG. 2, there is schematically shown an example of a ferroelectric liquid crystal cell. Reference numerals 21a and 21b denote substrates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layers 22 are oriented perpendicular to surfaces of the glass plates is hermetically disposed therebetween. A full line 23 shows liquid crystal molecules. Each liquid crystal molecule 23 has a dipole moment ($P_\perp$) 24 in a direction perpendicular to the axis thereof. When a voltage higher than a certain threshold level is applied between electrodes formed on the substrates 21a and 21b, the helical structure of the liquid crystal molecule 23 is unwound or released to change the alignment direction of respective liquid crystal molecules 23 so that the dipole moments ($P_\perp$) 24 are all directed in the direction of the electric field. The liquid crystal molecules 23 have an elongated shape and show refractive anisotropy between the long axis and the short axis thereof. Accordingly, it is easily understood that when, for instance, polarizers 25a and 25b as optical detector means, arranged in a cross nicol relationship, i.e., with their polarizing directions being crossing each other, are disposed on the upper and the lower surfaces of the glass plates, the liquid crystal cell thus arranged functions as a liquid crystal optical modulation device the optical characteristics of which, such as contrast, vary depending upon the polarity of an applied voltage. Further, when the thickness of the liquid crystal cell is sufficiently thin (e.g., 1μ), the helical structure of the liquid crystal molecules is unwound without application of an electric field whereby the dipole moment assumes either of the two states, i.e., Pa in an upper direction 34a or Pb in a lower direction 34b as shown in FIG. 3. When electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented to either of a first stable state 33a and a second stable state 33b.

When the above-mentioned ferroelectric liquid crystal is used as an optical modulation element, it is possible to obtain two advantages. The first is that the response speed is quite fast. The second is that the orientation of the liquid crystal shows bistability. The second advantage will be further explained, e.g., with reference to FIG. 3. When the electric field Ea is applied to the liquid crystal molecules, they are oriented to the first stable state 33a. This state is stably retained even if the electric field is removed. On the other hand, when the electric field Eb whose direction is opposite to that of the electric field Ea is applied thereto, the liquid crystal molecules are oriented to the second stable state 33b, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ.

A preferred embodiment of the driving method according to the present invention will now be explained with reference to FIGS. 4 and 7.

Figure 4:
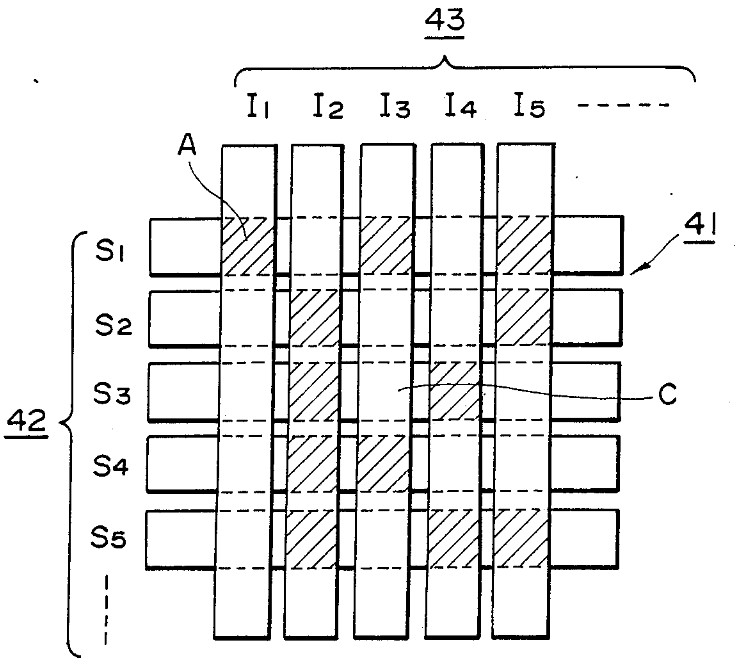
FIG. 4 is a plan view of a matrix pixel arrangement used in the present invention.

Referring to FIG. 4, there is schematically shown an example of a cell 41 having a matrix electrode arrangement in which a ferroelectric liquid crystal (not shown) is interposed between scanning electrodes 42 and signal electrodes 43. For brevity of an explanation, a case where binary states of "white" and "black" are displayed will be explained. In FIG. 4, the hatched pixels are assumed to be displayed in "black" and the other pixels, in "white". FIGS. 5A and 5B show a scanning selection signal applied to a selected scanning electrode and a scanning non-selection signal applied to the other scanning electrodes (nonselected scanning electrodes), respectively. FIGS. 5C and 5D show an information selection signal applied to a selected signal electrode and an information non-selection signal applied to a nonselected signal electrode. In FIGS. 5A–5D, the abscissa and the ordinate represent time and voltage, respectively.

According to the driving method of the present invention, a writing period (phases $t_1+t_2+t_3+t_4$) for writing in the respective pixels on a selected scanning electrode line comprises a first auxiliary phase $t_1$, a first display state (contrast)-determining phase $t_2$, a second auxiliary phase $t_3$, and a second display state (contrast)-determining step. In this embodiment, the pulse durations of the phases $t_1$, $t_2$, $t_3$ and $t_4$ are set to be all the same but they can be different.

The term "display state (contrast)-determining phase" used herein means a phase which determines one display state, i.e., either a bright state or a dark state, of a selected pixel and the other pixels on a selected scanning electrode line and which is the last phase for applying a voltage having an amplitude exceeding a threshold voltage of a ferroelectric liquid crystal, during a writing period on the selected scanning electrode line. More specifically, in the embodiment of FIG. 8, the phase $t_2$ corresponds to a display state-determining phase for determining a black display state for a selected pixel, and the phase $t_4$ corresponds to a display state-determining phase for determining a white display state for the other pixels, respectively on a selected electrode line.

Further, the term "auxiliary phase" described herein means a phase for applying an auxiliary signal not determining the display state of a pixel and a phase other than the display state-determining phase and the erasure phase. More specifically, the phases $t_1$ and $t_3$ in FIGS. 5A and 6A correspond to the auxiliary phases.

Figure 7:
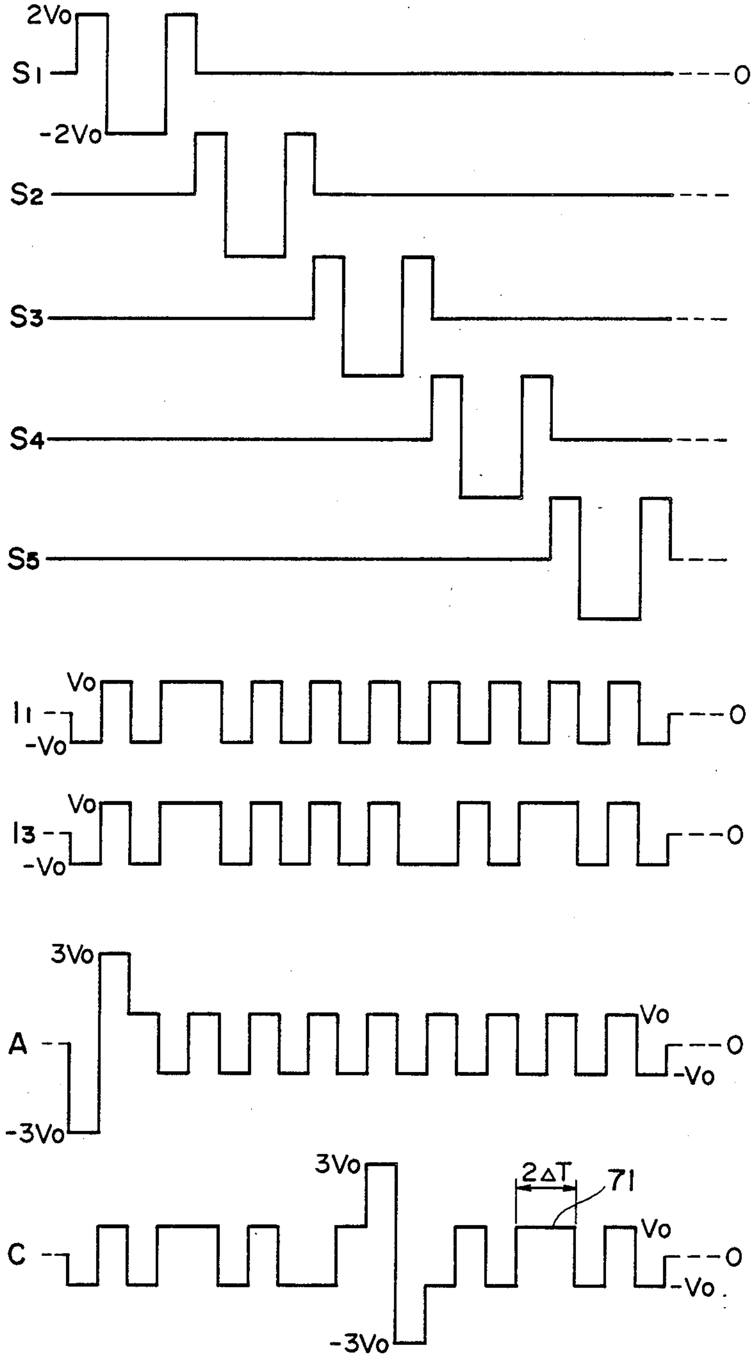
FIG. 7 shows voltage waveforms of the above signals applied and expressed in time series.

Accordingly in the embodiments shown in FIGS. 5–7, a scanning selection signal comprising phases $t_1+t_2+t_3+t_4$ shown in FIG. 5A is sequentially applied to the respective scanning electrode lines, while a signal comprising phases $t_1+t_2+t_3+t_4$ shown in FIG. 5B is applied to the scanning electrodes to which the scanning selection signal is not being applied. On the other hand, writing signals shown in FIGS. 5C and 5D are selectively applied to the signal electrodes in phase with the scanning selection signal.

Now, if a first threshold voltage for providing a first stable state (assumed to provide a "white" state) of a bistable ferroelectric liquid crystal device for an application time of $\Delta t$ (writing pulse duration) is denoted by $-V_{th1}$, and a second threshold voltage for providing a second stable state (assumed to provide a "black" state) for an application time $\Delta t$ is denoted by $+V_{th2}$, an electric signal applied to a selected scanning electrode has voltage levels of $+2\ V_0$ at phase (time) $t_1$, $-2\ V_0$ at phase $t_3$ and $2\ V_0$ at phase $t_4$ as shown in FIG. 5A. The other scanning electrodes are grounded and placed in a 0 volt state as shown in FIG. 5B. On the other hand, an electric signal applied to a selected signal electrode has voltage levels of $-V_0$ at phase $t_1$, $V_0$ at phase $t_2$, again $V_0$ at phase $t_3$ and $V_0$ at at phase $t_4$ as shown in FIG. 5C. Further, an electric signal applied to a nonselected signal electrode has voltage levels of $V_0$ at phase $t_1$, $-V_0$ at phase $t_2$, $V_0$ at phase $t_3$, and again $-V_0$ at phase $t_4$.

In this way, both the voltage waveform applied to a selected signal electrode and the voltage waveform applied to a nonselected signal electrode, alternate corresponding to the phases $t_1$, $t_2$, $t_3$ and $t_4$, and the respective alternating waveforms have a phase difference of 180° with respect to each other.

In the above method, the respective voltage values are set to desired values satisfying the following relationships:

$$V_0 < V_{th2} < 3V_0,$$

and $$-3\ V_0 < -V_{th1} < -V_0.$$

Voltage waveforms applied to respective pixels when the above electric signals are applied, are shown in FIGS. 6A–6D.

FIGS. 6A and 6B show voltage waveforms applied to pixels for displaying "black" and "white", respectively, on a selected scanning electrodes. Further, FIGS. 6C and 6D show voltage waveforms respectively applied to pixels on nonselected scanning electrodes.

As shown in FIG. 6A, a pixel on a selected scanning electrode line and on a selected signal electrode line is supplied with a voltage of $-3\ V_0$ exceeding the threshold $-V_{th1}$ at phase $t_1$ and with $3\ V_0$ exceeding the threshold $V_{th2}$ at subsequent phase $t_2$ to be written in "black" based on the second stable state, in a period of first unit waveform comprising the phases $t_1$ and $t_2$. As a result, the display state "black" is determined at the phase $t_2$. In a subsequent period of second unit waveform comprising phases $t_3+t_4$, the pixel is supplied with $V_0$ at phase $t_3$ and $-V_0$ at phase $t_4$, each not exceeding $-V_{th1}$ or $V_{th2}$, and retains the second stable state, so that "black" is written in the writing period.

On the other hand, a pixel on a selected scanning electrode line and on a nonselected scanning electrode line is supplied with $-V_0$ at phase $t_1$ and $V_0$ at phase $t_2$ to retain a previous state in a period of first unit waveform comprising the phases $t_1+t_2$ (a voltage waveform having a phase difference of 180° with respect to the voltage waveform applied to the nonselected signal electrode). In a period of second unit waveform comprising phases $t_3$ and $t_4$, the pixel is supplied with $3\ V_0$ exceeding the threshold $V_{th}$ to be once written in a "black" display state based on the second stable state and then with $-3\ V_0$ exceeding the threshold $-V_{th1}$ at subsequent phase $t_4$ thereby to be written in a "white" display state based on the first stable state. As a result, the display state of "white" is determined at the fourth phase $t_4$.

FIG. 7 shows the above mentioned driving signals expressed in time series. Electrical signals applied to scanning electrodes are shown at $S_1$–$S_5$, electric signals applied to signal electrodes are shown at $I_1$ and $I_3$, and voltage waveforms applied to pixels A and C in FIG. 4 are shown at A and C.

Now, the significance of the driving method according to the present invention will now be explained in some detail. The microscopic mechanism of switching states due to an electric field of a ferroelectric liquid crystal under a bistability condition has not been fully clarified. Generally speaking, however, the ferroelectric liquid crystal can retain its stable state semi-permanently, if it has been switched or oriented to the stable state by the application of a strong electric field for a predetermined time and is left standing under absolutely no electric field. However, when a reverse polarity of an electric field is applied to the liquid crystal for a long period of time, even if the electric field is such a weak field (corresponding to a voltage below $V_{th}$ in the previous example) that the stable state of the liquid crystal is not switched in a predetermined time for writing, the liquid crystal can change its stable state to the other one, whereby correct display or modulation of information cannot be accomplished. We have recognized that the liability of such switching or reversal of oriented states under the long term application of a weak electric field is affected by the material and roughness of a substrate contacting the liquid crystal and the kind of the liquid crystal, but have not clarified the effects quantitatively. We have confirmed a tendency that a uniaxial treatment of the substrate such as rubbing or oblique or tilt vapor deposition of SiO, etc., increases the liability of the above-mentioned reversal of oriented states. The tendency is manifested at a higher temperature compared to a lower temperature.

Anyway, in order to accomplish correct display or modulation of information, it is advisable that one direction of the electric field is prevented from being applied to the liquid crystal for a long time.

In view of the above problem, in the above embodiment of the driving method according to the present invention, the pixels on a nonselected scanning electrode line are only supplied with a voltage waveform alternating between $-V_0$ and $V_0$, at phases $t_1$, $t_2$, $t_3$ and $t_4$, each below the threshold voltages as shown in FIGS. 6C and 6D, so that the liquid crystal molecules therein do not change the orientation states but keep providing the display states attained in the previous scanning. Further, as the voltages of $V_0$ and $-V_0$ are alternately repeated in the phases $t_1$, $t_2$, $t_3$ and $t_4$, the phenomenon of inversion to another stable state (i.e., crosstalk) due to the continuous application of a voltage of one direction does not occur. Furthermore, in the present invention, the period wherein a voltage of $V_0$ (nonwriting voltage) is continually applied to a pixel A or C is $2\Delta T$ at the longest appearing at a waveportion 71 in the waveform shown at A, wherein $\Delta T$ denotes a unit writing pulse, and each of the phases $t_1$, $t_2$, $t_3$ and $t_4$ has a pulse duration $\Delta T$ in this embodiment, so that the above mentioned inversion phenomenon can be completely prevented even if the voltage margin during driving (i.e., the difference between writing voltage level ($3V_0$) and nonwriting voltage level ($V_0$)) is not widely set.

In the above embodiment, a unit waveform comprising a display state-determining phase and an auxiliary phase is repeated two times, while such a unit waveform may be repeated three or more times. In other words, two or more units or sets of such a unit waveform may be contained in a single writing period for the respective pixels on a selected scanning electrode.

Figure 10:
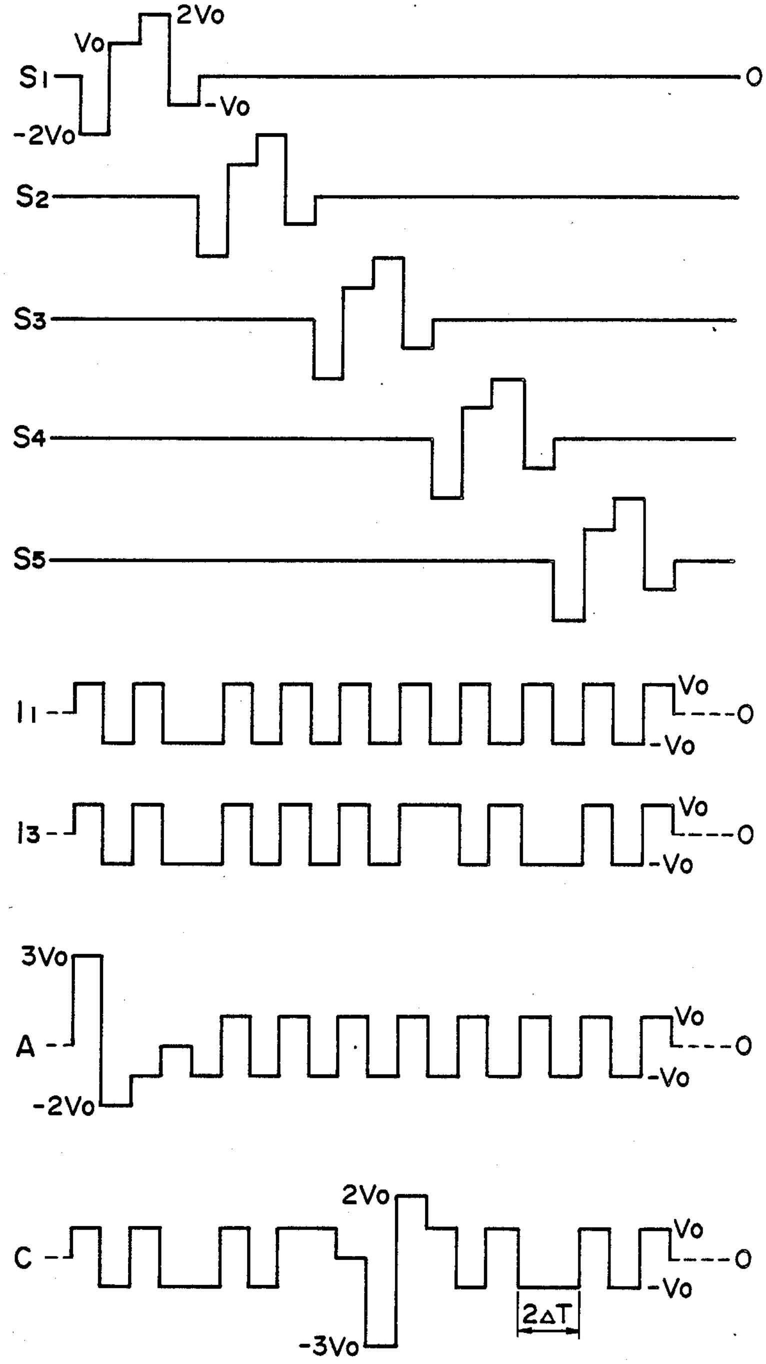
FIG. 10 shows voltage waveforms of the above mentioned another set of signals applied and expressed in time series.

FIGS. 8–10 show another embodiment of the driving method according to the present invention. In this embodiment, the voltage $V_0$ is set to satisfy the relations of $2V_0 < V_{th2} < 3V_0$ and $-2V_0 > -V_{th1} > -3V_0$.

As shown in FIG. 8A, a scanning selection voltage waveform applied to a selected scanning electrode comprises four voltage levels of $-2V_0$, $V_0$, $2V_0$ and $-V_0$ at phases $t_1$, $t_2$, $t_3$ and $t_4$, respectively, and a voltage level of 0 V is applied at the time of nonselection (as shown in FIG. 8B), amounting to 5 different voltage levels in total. Further, voltage waveforms applied to signal electrodes comprise voltage levels of $V_0$, $-V_0$, $V_0$ and $-V_0$ at the time of selection, and $-V_0$, $V_0$, $-V_0$ and $V_0$ at the time of nonselection, at phases $t_1$, $t_2$, $t_3$ and $t_4$, respectively, as different from those shown in FIGS. 5C and 5D. On the other hand, voltage waveforms applied to pixels on a selected scanning electrode line comprises a voltage for writing "black" at a selected pixel at phase $t_1$ and a voltage for writing "white" at the remaining pixels at phase $t_3$. As apparent in view of time-serially expressed driving signals shown in FIG. 10, the duration of a voltage in one direction continually applied to a pixel is $2\Delta T$ at the maximum when a writing pulse duration is $\Delta T$.

Thus, in this embodiment, the phase $t_1$ is a display state-determining phase for determining a black display state, and the phase $t_3$ is a display state-determining phase for determining a white display state.

On the other hand, the phases $t_2$ and $t_4$ are respectively an auxiliary phase not responsible for determination of a display state of a pixel.

By adopting the above driving method, the pixels on a scanning electrode line to which a scanning nonselection signal is applied are supplied with an alternating voltage waveform always comprising voltages below the thresholds, and the maximum pulse duration of a continually applied voltage of the same polarity applied to the pixel is $2\Delta T$, so that the voltage margin during driving can be flexibly set.

As described hereinabove, according to the present invention, even when a display panel using a ferroelectric liquid crystal device is driven at a high speed, the maximum pulse duration of a voltage waveform continually applied to the pixels on the scanning electrode lines to which a scanning non-selection signal is applied is suppressed to two times the writing pulse duration $\Delta T$, so that the phenomenon of one display state being inverted to another display state during writing of one whole picture may be effectively prevented.

What is claimed is:

1. A driving method for an optical modulation device comprising scanning electrodes and signal electrodes disposed opposite to and intersecting with the signal electrodes, and an optical modulation material disposed between the scanning electrodes and the signal electrodes, having a pixel at each intersection of the scanning electrodes and the signal electrodes so as to form a matrix of pixels and exhibiting contrast depending on the magnitude and polarity of a voltage applied to each pixel of the matrix;

said driving method comprising the step of writing on respective pixels on a selected scanning electrode in a writing period defined by application of a scanning selection signal voltage to the selected scanning electrode, the writing period comprising a former half period and a latter half period which is subsequent to the former half period, the former half period comprising a first state-determining phase for causing a selected one of the respective pixels on the selected scanning electrode to assume one optical state of two optical states and a first auxiliary phase prior to the first state-determining phase for causing the selected one of the respective pixels to assume a second optical state, and the latter half period comprising a second state-determining phase for causing at least a remaining non-selected one of the respective pixels on the selected scanning electrode to assume the second optical state and a second auxiliary phase prior to the second state-determining phase for causing the remaining non-selected pixels to assume the one optical state, and supplying both the pixel selected in the latter half period and the pixels non-selected in the former half period with an alternating voltage to maintain their optical state.

2. A driving method according to claim 1, wherein said writing step further comprises the steps of applying different voltages to the pixels on the selected scanning electrode at each of the first and second state-determining phases, and applying the different voltages to the pixels on the selected scanning electrode at each of the first and second auxiliary phases.

3. A driving method according to claim 1, wherein said writing step further comprises the step of applying alternating voltages to the pixels on a nonselected scanning electrode throughout the writing period including the first and second state-determining phases and the first and second auxiliary phases.

4. A driving method according to claim 1, wherein said writing step further comprises the step of applying a first voltage signal to a selected signal electrode at the first state-determining phase and applying a second voltage signal to the a remaining non-selected signal electrodes at the second state-determining phase, the first and second voltage signals being signals of mutually different voltages.

5. A driving method according to claim 4, wherein the first and second voltage signals are of mutually opposite polarities with respect to the voltage level of a nonselected scanning electrode.

6. A driving method according to claim 1, wherein said writing step comprises the steps of applying a voltage signal exceeding a threshold voltage of the optical modulation material to a selected pixel among the pixels on a selected scanning electrode at one of the state-determining phases, and simultaneously applying a voltage not exceeding the threshold voltage to the remaining non-selected pixels on the selected scanning electrode.

7. A driving method according to claim 1, wherein said writing step comprises the step of continually applying a voltage of the same polarity to a pixel on a scanning electrode, wherein the duration of the continually applied voltage of the same polarity applied to the pixel on the scanning electrode does not exceed twice the duration of the first or second state-determining phases.

8. A driving method according to claim 1, wherein said writing step further comprises the step of applying, in the writing period, a first voltage to a selected pixel on the selected scanning electrode at the first state-determining phase, the first voltage having a polarity opposite to that of the voltage applied to the selected pixel at the first auxiliary phase and a second voltage to the remaining non-selected pixels on the selected scanning electrode at the second state-determining phase, the second voltage having a polarity opposite to the voltage applied to the remaining non-selected pixels at the second auxiliary phase.

9. A driving method according to claim 8, wherein the voltages applied at the first and second auxiliary phases exceed a threshold voltage of the optical modulation material.

10. A driving method according to claim 1, wherein the optical modulation material comprises a ferroelectric liquid crystal.

11. A driving method according to claim 10, wherein the ferroelectric liquid crystal comprises a chiral smectic liquid crystal.

12. A driving method according to claim 10, wherein the chiral smectic liquid crystal is disposed in a layer sufficiently thin to release the helical structure of the chiral smectic liquid crystal in the absence of an electric field.

13. A driving method for an optical modulation device comprising scanning electrodes and signal electrodes disposed opposite to and intersecting with the signal electrodes, and an optical modulation material disposed between the scanning electrodes and the signal electrodes, having a pixel at each intersection of the scanning electrodes and the signal electrodes so as to form a matrix of pixels and exhibiting contrast depending on the magnitude and polarity of a voltage applied to each pixel of the matrix; said driving method comprising the steps of:

applying to a selected pixel on a selected scanning electrode a voltage of one polarity having an amplitude exceeding a first threshold voltage of the optical modulation material at a first auxiliary phase, and a voltage of the other polarity having an amplitude exceeding a second threshold voltage at a first state-determining phase after the first auxiliary phase;

applying to a nonselected pixel on the selected scanning electrode a voltage of the other polarity having an amplitude exceeding the second threshold voltage at a second auxiliary phase after the first state-determining phase, and a voltage of the one polarity exceeding the first threshold voltage at a second state-determining phase after the second auxiliary phase; and applying to the nonselected pixel on the selected scanning electrode a voltage not exceeding the threshold voltages of the optical modulation material throughout a period including the first auxiliary and state-determining phases while the selected pixel on the selected scanning electrode is supplied with the voltage of one polarity having an amplitude exceeding the first threshold voltage and the voltage of the other polarity having an amplitude exceeding the second threshold voltage.

14. A driving method according to claim 13, wherein said optical modulation material comprises a ferroelectric liquid crystal.

15. A driving method according to claim 14, wherein said ferroelectric liquid crystal comprises a chiral smectic liquid crystal.

16. A driving method according to claim 15, wherein said chiral smectic liquid crystal is disposed in a layer sufficiently thin to release the helical structure of the chiral smectic liquid crystal in the absence of an electric field.

17. A driving method for an optical modulation device comprising scanning electrodes and signal electrodes disposed opposite to and intersecting with the signal electrodes, and an optical modulation material disposed between the scanning electrodes and the signal electrodes, having a pixel at each intersection of the scanning electrodes and the signal electrodes so as to form a matrix of pixels and exhibiting contrast depending on the magnitude and polarity of a voltage applied to each pixel of the matrix; said driving method comprising the steps of:

applying to a selected pixel on a selected scanning electrode a voltage of one polarity having a first duration and an amplitude sufficient to exceed a threshold of the optical modulation material in a first phase, a voltage of the other polarity having a second duration and an amplitude insufficient to exceed the threshold in a second phase and third phase, and a voltage of 0 in a fourth phase; and applying to a nonselected pixel on the selected scanning electrode a voltage of the other polarity having a duration and an amplitude sufficient to exceed the threshold in the third phase, a voltage of the one polarity having a duration and an amplitude insufficient to exceed the threshold voltage in the first and fourth phases, and a voltage of 0 in the second phase, wherein the first, second, third and fourth phases are sequential in that order.

18. A driving method according to claim 17, wherein the optical modulation material comprises a ferroelectric liquid crystal.

19. A driving method according to claim 18, wherein the ferroelectric liquid crystal comprises a chiral smectic liquid crystal.

20. A driving method according to claim 19, wherein the chiral smectic liquid crystal is disposed in a layer thin enough to release the helical structure of the chiral smectic liquid crystal in the absence of an electric field.

21. An optical modulation apparatus comprising:

an optical modulation device comprising scanning electrodes and signal electrodes disposed opposite to and intersecting with said signal electrodes, and an optical modulation material disposed between said scanning electrodes and said signal electrodes, having a pixel at each intersection of said scanning electrodes and said signal electrodes so as to provide a matrix of pixels and exhibiting contrast depending on the magnitude and polarity of a voltage applied to each pixel of said matrix;

an optical detection means; and a driving unit for applying to a selected pixel on a selected scanning electrode a voltage of one polarity having an amplitude exceeding a first threshold voltage of said optical modulation material at a first auxiliary phase, and a voltage of the other polarity having an amplitude exceeding a second threshold voltage at a first state-determining phase after the first auxiliary phase; and applying to a nonselected pixel on said selected scanning electrode a voltage of the other polarity having an amplitude exceeding the second threshold voltage at a second auxiliary phase after the first state-determining phase and a voltage of said one polarity exceeding the first threshold voltage at a second state-determine phase after the second auxiliary phase, wherein an alternating voltage not exceeding the first or second threshold voltages is supplied to said selected pixel during the second auxiliary phase and the second state-determining phase and the non-selected pixel during the first auxiliary phase and the first state-determining phase.

22. An optical modulation apparatus according to claim 21, wherein said optical modulation material comprises a ferroelectric liquid crystal.

23. An optical modulation apparatus according to claim 22, wherein said ferroelectric liquid crystal comprises a chiral smectic liquid crystal.

24. An optical modulation apparatus according to claim 23, wherein said chiral smectic liquid crystal is disposed in a layer sufficiently thin to release the helical structure of the chiral smectic liquid crystal in the absence of an electric field.

25. An optical modulation device, comprising:

scanning electrodes and signal electrodes disposed opposite to and intersecting with the signal electrodes, and an optical modulation material disposed between the scanning electrodes and the signal electrodes, having a pixel at each intersection of the scanning electrodes and the signal electrodes so as to form a matrix of pixels exhibiting contrast depending on the magnitude and polarity of a voltage applied thereto;

an optical detection means; and a driving unit for driving the matrix of pixels by steps of:

applying to a selected pixel on a selected scanning electrode a voltage of one polarity having a first duration and an amplitude sufficient to exceed a threshold of said optical modulation material in a first phase, a voltage of the other polarity having a second duration and amplitude insufficient to exceed the threshold in a second and third phase, and a voltage of 0 in a fourth phase, and applying to a non-selected pixel on said selected scanning electrode a voltage of the other polarity having a third duration and an amplitude sufficient to exceed the threshold in the third phase, a voltage of the one polarity having a fourth duration and an amplitude insufficient to exceed the threshold in the first and fourth phases and a voltage of 0 in the second phase, wherein the first, second, third and fourth phases are sequential in that order.

26. An optical modulation apparatus according to claim 25, wherein said optical modulation material comprises a ferroelectric liquid crystal.

27. An optical modulation apparatus according to claim 26, wherein said ferroelectric liquid crystal comprises a chiral smectic liquid crystal.

28. An optical modulation apparatus according to claim 27, wherein said chiral smectic liquid crystal is disposed in a layer sufficiently thin to release the helical structure of the chiral smectic liquid crystal in the absence of an electric field.

29. An optical modulation apparatus comprising:

an optical modulation device comprising scanning electrodes and signal electrodes disposed opposite to and intersecting with the signal electrodes, and an optical modulation material disposed between the scanning electrodes and the signal electrodes, having a pixel at each intersection of the scanning and the signal electrodes so as to provide a matrix of pixels exhibiting contrast depending on the magnitude and polarity of a voltage applied thereto;

an optical detection means; and a driving unit for driving said optical modulation device by (i) applying to a selected pixel on a selected scanning electrode a first bipolar pulse causing said selected pixel to assume one optical state during the former half of a period during which pulses are applied to said pixels and a second bipolar pulse which maintains the one optical state of said selected pixel during the latter half of the period; and (ii) applying to a nonselected pixel on said selected scanning electrode a third bipolar pulse not changing the optical state of said nonselected pixel during the former half of the period and a fourth bipolar pulse causing said nonselected pixel to assume the other optical state during the latter half of the period.

30. An optical modulation apparatus according to claim 29, wherein said first, second, third, and fourth bipolar pulses are respectively balanced bipolar pulses.

31. An optical modulation apparatus according to claim 30, wherein said optical modulation material comprises a ferroelectric liquid crystal.

32. An optical modulation apparatus according to claim 31, wherein said ferroelectric liquid crystal comprises a chiral smectic liquid crystal.

33. An optical modulation apparatus according to claim 32, wherein said chiral smectic liquid crystal is disposed in a layer sufficiently thin to release the helical structure of the chiral smectic liquid crystal in the absence of an electric field.

* * * * *